US00RE40906E

(19) United States
(12) Reissued Patent
Kim

(10) Patent Number: US RE40,906 E
(45) **Date of Reissued Patent: *Sep. 8, 2009**

(54) VIDEO SIGNAL CONVERTING APPARATUS AND DISPLAY DEVICE HAVING THE SAME

(75) Inventor: Byoung-Han Kim, Suwon-si (KR)

(73) Assignee: Samsung Electronics Co., Ltd., Suwon-si (KR)

( * ) Notice: This patent is subject to a terminal disclaimer.

(21) Appl. No.: 11/151,721

(22) Filed: Jun. 14, 2005

Related U.S. Patent Documents

Reissue of:
(64) Patent No.: 6,037,925
Issued: Mar. 14, 2000
Appl. No.: 08/840,892
Filed: Apr. 17, 1997

U.S. Applications:
(62) Division of application No. 10/860,664, filed on Jun. 4, 2004, now Pat. No. Re. 40,201, which is a continuation of application No. 10/097,118, filed on Mar. 14, 2002, now Pat. No. Re. 38,568.

(30) Foreign Application Priority Data

Apr. 17, 1996 (KR) ..... 96-11554
Dec. 10, 1996 (KR) ..... 96-64026

(51) Int. Cl.
*G09G 3/36* (2006.01)

(52) U.S. Cl. ..... 345/99; 345/3.3; 345/605; 345/660; 345/698; 345/202; 345/213; 345/531; 348/441; 348/445; 348/558; 382/299; 386/129

(58) Field of Classification Search ..... 345/3.3, 345/605; 386/129
See application file for complete search history.

(56) References Cited

U.S. PATENT DOCUMENTS 4,654,484 A 3/1987 Reiffel et al.
4,851,826 A 7/1989 Davis
5,038,218 A 8/1991 Matsumoto (Continued)

FOREIGN PATENT DOCUMENTS

| | | |
|---|---|---|
| EP | 0 254 805 | 2/1988 |
| EP | 0 368 572 | 5/1990 |
| EP | 0 519 744 | 12/1992 |
| EP | 0 540 294 | 5/1993 |
| JP | 5-323929 A | 12/1993 |
| JP | 6-19431 A | 1/1994 |
| JP | 6-275462 A | 9/1994 |
| JP | 7-013522 A | 1/1995 |
| JP | 7-501626 A | 2/1995 |
| JP | 7-073096 A | 3/1995 |
| JP | 7-104710 A | 4/1995 |
| JP | 7-199855 A | 8/1995 |
| JP | 7-295545 A | 11/1995 |
| JP | 8-110764 A | 4/1996 |
| JP | 8-160904 A | 6/1996 |

*Primary Examiner*—Kee M. Tung
*Assistant Examiner*—Antonio A Caschera
(74) *Attorney, Agent, or Firm*—Sughrue Mion, PLLC

(57) ABSTRACT

Disclosed is a video signal converting apparatus and a display device having the same which may convert a low-resolution video signal from a host into a different-resolution video signal capable of being displayed on the entire screen of a high-resolution supporting display device. The apparatus has a detector for detecting a first resolution signal indicative of a resolution of the first display signal using horizontal and vertical synchronization signals related to the first display, a comparator for comparing the first resolution signal with a second resolution signal indicative of a reference resolution; and a converter for converting the first display signal into the second resolution signal, if there is a difference between the first and the second resolution signals.

1 Claim, 11 Drawing Sheets

U.S. PATENT DOCUMENTS 5,051,929 A 9/1991 Tutt et al.
5,245,328 A 9/1993 Garrett
5,283,561 A 2/1994 Lumelsky et al.
5,301,265 A 4/1994 Itoh
5,406,308 A 4/1995 Shiki
5,471,563 A 11/1995 Dennis et al.
5,485,216 A * 1/1996 Lee ..... 348/443
5,499,036 A 3/1996 Hauck
5,528,740 A 6/1996 Hill et al.
5,534,883 A 7/1996 Koh
5,535,018 A 7/1996 Yamano et al.
5,557,691 A 9/1996 Izuta
5,568,597 A 10/1996 Nakayama et al.
5,592,194 A 1/1997 Nishikawa
5,612,715 A 3/1997 Karaki et al.
5,642,138 A 6/1997 Hijkata
5,696,531 A 12/1997 Suzuki et al.

* cited by examiner

VIDEO SIGNAL CONVERTING APPARATUS AND DISPLAY DEVICE HAVING THE SAME

Matter enclosed in heavy brackets [ ] appears in the original patent but forms no part of this reissue specification; matter printed in italics indicates the additions made by reissue.

*More than one reissue application has been filed. This is a divisional reissue of Continuation Reissue application Ser. No. 10/860,664 filed Jun. 4, 2004, and issued on Apr. 1, 2008, as RE 40,201, which is a continuation of Reissue application Ser. No. 10/097,118 filed Mar. 14, 2002, and issued on Aug. 24, 2004 as RE 38,568, of U.S. Pat. No. 6,037,925 (of application Ser. No. 08/840,892). The entire disclosures of the prior applications, application Ser. Nos. 10/860,664, 10/097,118, and 08/840,892 are considered part of the disclosure of the accompanying application and are hereby incorporated by reference. Further, four (4) Divisional Reissue application Ser. Nos. 11/151,718, filed Jun. 14, 2005, 11/151,719, filed Jun. 14, 2005, 11/151,720, filed Jun. 14, 2005, and 11/151,721, filed Jun. 14, 2005, are divisional reissues of Reissue application Ser. No. 10/860,664. One (1) Continuation Reissue application Ser. No. 11/094,752, filed on Mar. 31, 2005, is a continuation of application Ser. No. 10/860,664 that has been abandoned.*

CLAIM OF PRIORITY

This application makes reference to, incorporates the same herein, and claims all benefits accruing under 35 U.S.C. §119 from two applications entitled A Video Signal Converting Apparatus and a Display Device Having the Same earlier filed in the Korean Industrial Property Office on Apr. 17, 1996 and Dec. 10, 1996, and there duly assigned Ser. No. 96-11554 and 96-64026, respectively, by that Office.

BACKGROUND OF THE INVENTION

1. Field of the Invention

The present invention relates to an apparatus for converting a low-resolution signal applied from a host into a video signal having different-resolution, and a display device having the same.

2. Background Art

Display devices, such as a liquid crystal display (LCD) device and plasma display device, have a plurality of pixels for displaying an image, wherein the pixel brightness is controlled in accordance with video information provided from a host.

An exemplary active matrix LCD device, which is provided with an LCD control unit and an LCD panel, displays an image on the screen of the LCD panel in a such manner that pixels are turned on/off by means of switching elements corresponding respectively to the pixels. The LCD control unit converts analog color signals from a host (e.g., a personal computer) into digital RGB color signals and generates a horizontal output signal, a vertical output signal and a dot (i.e., pixel) clock signal in response to horizontal synchronization signals and vertical synchronization signals from the host. The LCD panel has an LCD driving unit therein. The digital RGB color signals, dot clock signal, horizontal output signals and vertical output signals, which are provided from the LCD control unit, are supplied to the LCD driving circuit incorporated in the LCD panel.

An exemplary LCD control unit, which is provided to control the LCD panel, has a phase locked loop (PLL) circuit and an analog-to-digital converter (ADC). When the PLL circuit receives a horizontal synchronization signal, it generates a horizontal output signal and a dot clock signal. Also the ADC circuit converts analog color signals of R (red), G (green) and B (blue) from the host into digital color signals of R, G and B, respectively, which are supplied to the LCD driving circuit. The horizontal output signal Hout is produced from the horizontal synchronization signal, and the frequency of the horizontal output signal is equal to that of the horizontal synchronization signal. Meanwhile, the polarity of the horizontal synchronization signal being fed to the PLL circuit may be changed in accordance with the kinds of the host, and the PLL circuit outputs the horizontal output signal having a predetermined polarity. For example, in the LCD device having the driving circuit which is operated in synchronization with the horizontal output signal having negative polarity, even though the horizontal synchronization signal of positive polarity from the host is supplied to the PLL circuit in the LCD device, the PLL circuit supplies the horizontal output signal of negative polarity for the LCD driving circuit. The PLL circuit, as well known in the art, has a phase detector, a voltage controlled oscillator (VCO), a divider, and an output generator.

In general, the exemplary LCD device embodies a single display mode, for example, Video Graphics Array (VGA) mode, Super VGA (SVGA) mode or extended Graphics Array (XGA) mode. Accordingly, if the VGA mode video signals of 640×480 active resolution are provided to the XGA mode supporting LCD device having the active resolution of 1024×768, an image is displayed on only a partial area of the LCD screen, and is not displayed on the screen's remaining area. If the SVGA mode signals having the active resolution of 800×600 are also provided to the XGA LCD device, the results are similar to the above case. Thus, one of several problems in the exemplary LCD device, if low-resolution display mode signals from the host are fed to an LCD device capable of supporting high-resolution display mode signals, is that an image is partially displayed on the LCD screen.

SUMMARY OF THE INVENTION

It is therefore an object of the present invention to provide a video signal converting apparatus which may convert a low-resolution video signal from a host into a different-resolution video signal capable of being displayed on the entire screen of a high-resolution supporting display device.

It is another object to provide a display device in which, even though low-resolution display mode signals from a host are provided to the display device, the low-resolution display mode signals may be displayed on the entire screen thereof.

According to an aspect of the present invention, a liquid crystal display (LCD) device receives horizontal, and vertical synchronization signals and at least one analog video signal synchronized with said horizontal video signal from a host and displays an image on a screen thereof. The LCD device comprises a display mode discriminating means for discriminating a display mode supported by the host in response to horizontal and vertical synchronization signals to generate first and second mode signals and first, second, third and fourth data signals related to a discriminated display mode. A clock generator generates first and second pixel clock signals in synchronization with the horizontal synchronization signal, and the first and second pixel clock signals have frequencies corresponding to first and second data signals, respectively. The pulse number of the first pixel clock signal corresponding to one horizontal line is equal to a value of the first data signal and the pulse number of the second pixel clock signal corresponding to one horizontal line is equal to a value of the second data signal. An analog-to-digital converter (ADC) converts at least one analog video signal into a digital video signal in synchronization with the first pixel clock signal. A memory for storing the digital video signal. A horizontal output generator for receiving third and fourth data signals in response to the vertical synchronization signal and generating a horizontal output signal, the digital video signal from the memory being in synchronization with the horizontal output signal, the pixel number per one cycle of the horizontal output signal being equal to a value of the third data signal, and the pixel number per a pulse width of the horizontal output signal being equal to a value of the fourth data signal. And, a memory controller is provided to enable the digital video signals to be stored in the memory in accordance with the mode signals, the horizontal synchronization signal and the first pixel clock signal, and enable the digital video signals stored in the memory to be read from the memory in accordance with the mode signals, the horizontal output signal and the second pixel clock signal.

In the embodiment, the memory comprises first, second and third memory blocks corresponding to R (red), G (green) and B (blue) data of the digital video signal each of the memory blocks having at least three line memories, each of which stores the corresponding digital R, G, B video signal from a corresponding ADC and corresponding to one horizontal line, and first, second and third multiplexers for selectively outputting data of the line memories of the corresponding memory block in response to a data selection signal from the memory controller. The memory controller comprises a flag generator for generating a plurality of flag signals indicative of the line memories into or from, which the digital video signal is stored or read, a memory selector for generating the first and second memory selection signals selecting the line memories in response to the flag signals to block simultaneous read and write operations of each memory line, and a memory operation control circuit for receiving the horizontal, and vertical synchronization signals and the first and second pixel clock signals, and controlling an access operation to the memory by means of the memory selector. The memory, the horizontal output generator and the memory controller are constituted by a single chip.

According to another aspect of the present invention, a video signal converting apparatus is provided to convert a first display signal of serial format into a second display signal of parallel format. The converting apparatus comprises a circuit for detecting a first resolution signal indicative of a resolution of the first display signal using horizontal and vertical synchronization, signals related to the first display; a circuit for comparing the first resolution signal with a second resolution signal indicative of a reference resolution; and a circuit for converting the first display signal into the second resolution signal, if there is a difference between the first and the second resolution signals.

According to a further aspect of the present invention, a display apparatus receives horizontal and vertical synchronization signals, and a video signal of serial format synchronized with the horizontal synchronization signal from a host, and displays an image on a screen composed of a plurality of horizontal lines, each of which has a plurality of pixels. The display apparatus comprises a circuit for detecting the pixel number corresponding to the video signal from the host using the horizontal and vertical synchronization signals; means for comparing the pixel number with a reference pixel number; and a circuit for sampling the video signal using a first frequency clock is generated in accordance with a difference between the pixel number and the reference pixel number and a display for displaying the sampled video signal on the screen in synchronization with a second frequency clock generated in accordance with the difference.

According to another aspect of the present invention, a video signal converting apparatus is provided to convert an analog video signal into a digital video signal. The video signal converting apparatus comprises a memory for storing the digital video signal. A horizontal output generator receives first and second data signals in response to a vertical synchronization signal and generates a horizontal output signal, the digital video signal being in synchronization with the horizontal output signal. The pixel number per one cycle of the horizontal output signal is equal to a value of the first data signal, and the pixel number per a pulse width of the horizontal output signal is equal to a value of the second data signal; and a memory controller for enabling the digital video signal to be stored in the memory.

BRIEF DESCRIPTION OF THE DRAWINGS

A more complete appreciation of the invention, and many of the attendant advantages thereof will be readily apparent as the same becomes better understood by reference to the following detailed description when considered in conjunction with the accompanying drawings in which like reference symbols indicate the same or similar components, wherein.

DETAILED DESCRIPTION OF PREFERRED EMBODIMENT

Figure 1:
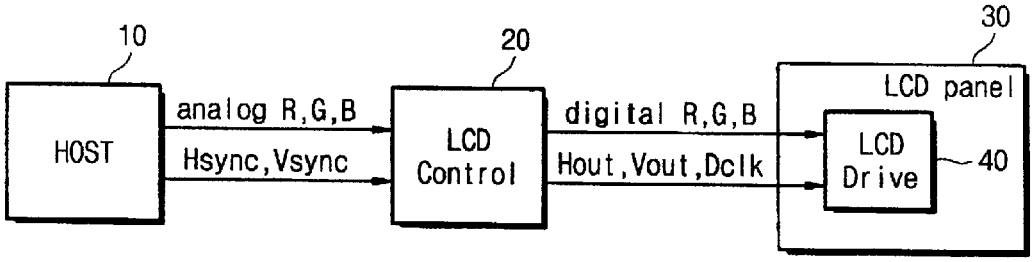
FIG. 1 is a schematic block diagram showing the construction of an exemplary active matrix LCD (liquid crystal display) device.

An exemplary active matrix LCD device, which is provided with an LCD control unit 20 and an LCD panel 30 as shown in FIG. 1, displays an image on the screen of LCD panel 30 in a such manner that pixels are turned on/off by means of switching elements corresponding respectively to the pixels. LCD control unit 20 converts analog color signals from a host 10 (e.g., a personal computer) into digital RGB color signals and generates a horizontal output signal Hout, a vertical output signal Vout and a dot (i.e., pixel) clock signal Dclk in response to horizontal synchronization signals Hsync and vertical synchronization signals Vsync from the host. LCD panel 30 has an LCD driving unit 40 therein. The digital RGB color signals, dot clock signal Dclk horizontal output signals Hout and vertical output signals Vout, which are provided from LCD control unit 20, are supplied to LCD driving circuit 40 incorporated in LCD panel 30.

Figure 2:
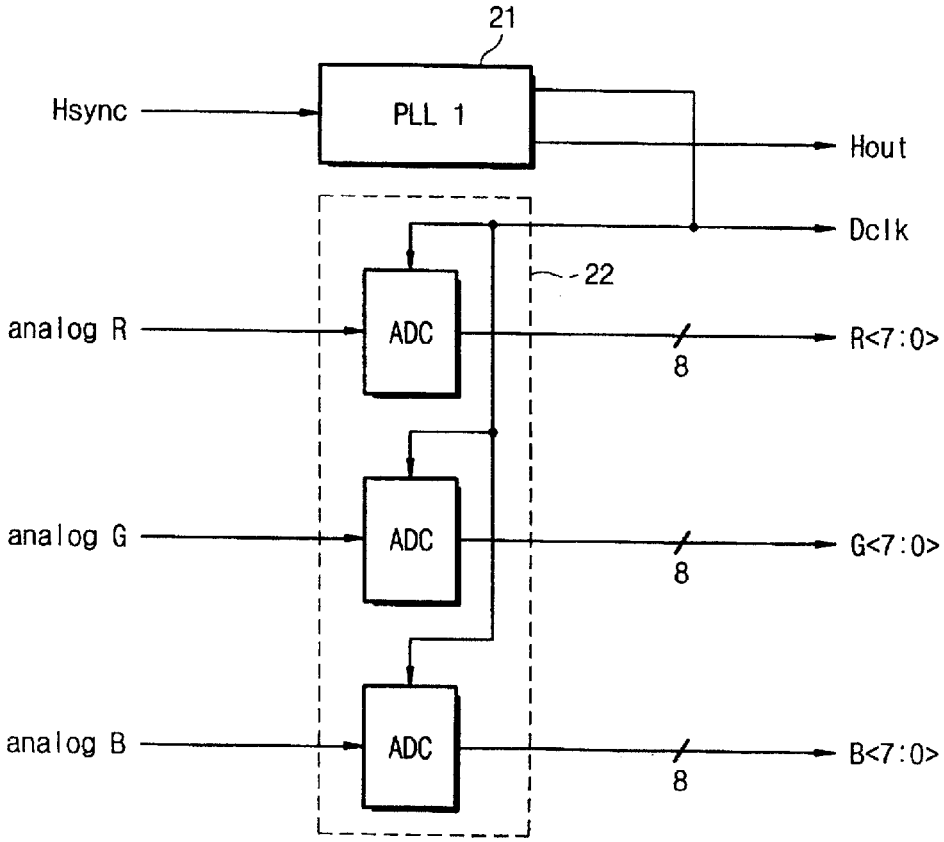
FIG. 2 is a block diagram showing the circuit construction of an exemplary LCD control unit.

Referring to FIG. 2, an exemplary LCD control unit 20, which is provided to control LCD panel 30, has a phase locked loop (PLL) circuit 21 and an analog-to-digital converter (ADC) 22. When PLL circuit 21 receives a horizontal synchronization signal Hsync, it generates a horizontal output signal Hout and a dot clock signal Dclk. Also, ADC circuit 22 converts analog color signals of R (red), G (green) and B (blue) from the host into digital color signals of R, G and B, respectively, which are supplied to LCD driving circuit 40. Horizontal output signal Hout is produced from horizontal synchronization signal Hsync, and the frequency of horizontal output signal Hout is equal to that of horizontal synchronization signal Hsync. Meanwhile, the polarity of horizontal synchronization signal Hsync being fed to PLL circuit 21 may be changed in accordance with the kinds of the host, and PLL circuit 21 outputs horizontal output signal Hout having a predetermined polarity. For example, in the exemplary LCD device having driving circuit 40 which is operated in synchronization with horizontal output signal Hout having negative polarity, even though horizontal synchronization signal Hsync of positive polarity from the host is supplied to PLL circuit 21 in the LCD device, PLL circuit 21 supplies horizontal output signal Hout of negative polarity for LCD driving circuit 40. PLL circuit 21, as well known in the art, has a phase sensor, a voltage controlled oscillator (VCO), a divider, and an output generator.

Figure 3:
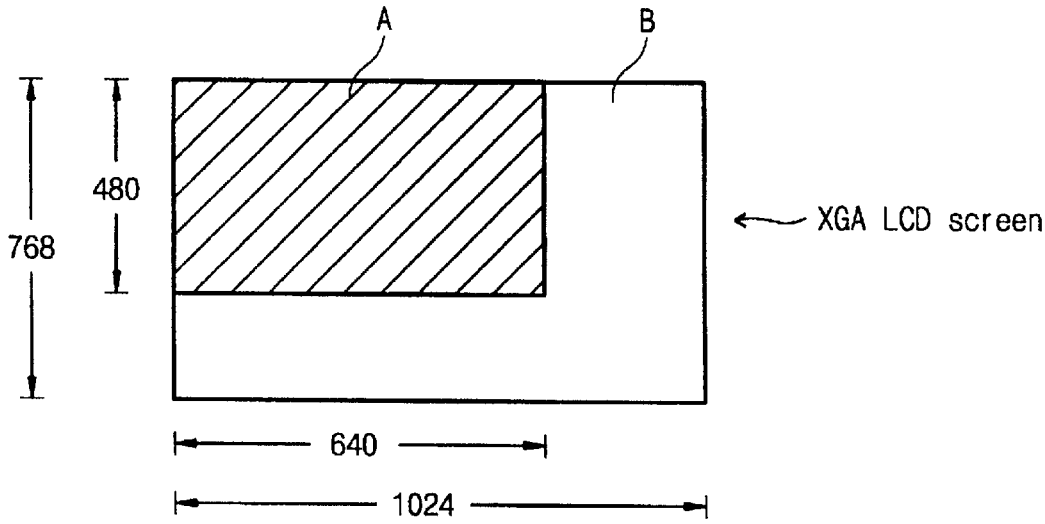
FIG. 3 is a diagram showing the image display area defined on the LCD screen by means of an exemplary XGA mode supporting LCD control unit, when VGA signals are fed to the LCD control unit.

In general, the exemplary LCD device embodies a single display mode, for example, Video Graphics Array (VGA) mode, Super VGA (SVGA) mode or extended Graphics Array (XGA) mode. Accordingly, if the VGA mode video signals of 640×480 active resolution are provided to the XGA mode supporting LCD device having the active resolution of 1024×768, an image is displayed on only a partial area "A" of the LCD screen, and is not displayed on the remaining area "B", as shown in FIG. 3. If the SVGA mode signals having the active resolution of 800×600 are also provided to the XGA LCD device, the results are similar to the above case. Thus, one of several problems in the exemplary LCD device, if low-resolution display mode signals from the host are fed to an LCD device capable of supporting high-resolution display mode signals, is that an image is partially displayed on the LCD screen.

It is assumed that a novel video signal converting apparatus according to the present invention is connected with an XGA mode supporting LCD panel and VGA mode video signals are fed from a host to the apparatus. The video signal converting apparatus then functions as an LCD controller. With the apparatus, the frequency of the vertical synchronization signal Vsync is kept constant therein, and the frequencies of a horizontal synchronization signal Hync and a dot clock signal Dclk are increasingly changed by 1.6 times to each input frequency, as shown by the below Table 1. As a result, an image of VGA mode can be displayed on the whole screen of the LCD device leaving the resolution of the XGA mode.

TABLE 1

| Before Conversion | | | After Conversion | |
|---|---|---|---|---|
| Resolution (dots × lines) | Horizontal Frequency (KHZ) | Vertical Frequency (Hz) | Horizontal Frequency (KHZ) | Resolution (dots × lines) |
| 640 × 350 (800 × 449) | 31.50 | 70.0 | 50.40 | 1024 × 560 (1280 × 718) |
| 640 × 480 (800 × 525) | 31.50 | 60.0 | 50.40 | 1024 × 768 (1280 × 840) |
| 640 × 400 (800 × 449) | 31.50 | 70.0 | 50.40 | 1024 × 640 (1280 × 718) |
| 640 × 350 (800 × 520) | 37.87 | 72.8 | 60.59 | 1024 × 768 (1331 × 832) |

In the above Table 1, the resolution represents the active resolution, the value in the parentheses represents the total resolution.

As shown in the above Table 1, for example, the ratio of the resolution before conversion to the resolution after conversion is 1:1.6, since the resolution of 640×480 is converted into 1024×768. With this conversion method, color signals of R. G and B corresponding to 5 lines are changed into color signals corresponding to 8 lines.

Figure 4:
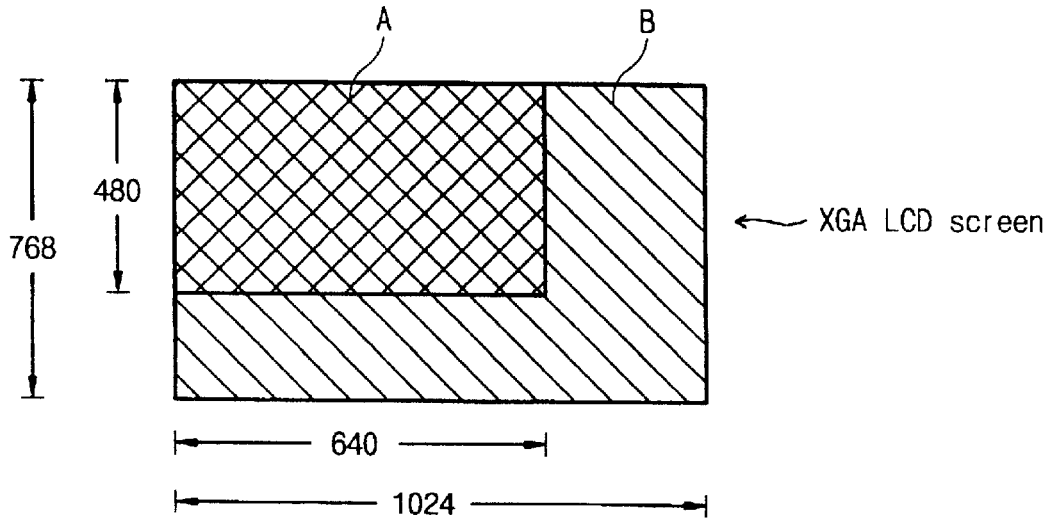
FIG. 4 is a diagram showing the image display area defined on an LCD screen by means of a novel XGA mode supporting LCD control unit according to the present invention, when VGA signals are fed to the LCD control unit according to the principles of the present invention.

Next, if the SVGA mode signals are fed to the LCD controller (i.e., the video signal converter) according to this embodiment, the frequency of the vertical synchronization signal Vsync is kept to be constant, and the frequency of the horizontal signal Hsync and that of the dot clock signal Dclk is increased by 1.25 times to each input frequency, as shown in the below Table 2. As a result, the image can be almost displayed in the resolution of the XGA mode on the LCD screen, as shown in FIG. 4.

TABLE 2

| Before Conversion | | | After Conversion | |
|---|---|---|---|---|
| Resolution (dots × lines) | Horizontal Frequency (KHZ) | Vertical Frequency (Hz) | Horizontal Frequency (KHZ) | Resolution (dots × lines) |
| 800 × 600 (1024 × 625) | 35.16 | 56.2 | 43.95 | 1000 × 750 (1280 × 781) |
| 800 × 600 (1056 × 628) | 37.88 | 60.3 | 47.35 | 1000 × 750 (1320 × 785) |
| 800 × 600 (1056 × 628) | 48.08 | 72.0 | 60.10 | 1000 × 750 (1320 × 785) |

In the above Table 2, the resolution represents the active resolution, and the value in the parentheses represents the total resolution.

The ratio of the resolution after conversion to the resolution before conversion may be 1:1.28. As a matter of convenience for conversion, however, the ratio of the resolution before conversion to the resolution after conversion is established to 1:1.25, since the resolution of 800×600 is converted into the resolution of 1000×750, as shown in Table 2. In accordance with this conversion process, color signals corresponding to 4 lines are converted into the color signals corresponding to 5 lines.

Figure 5:
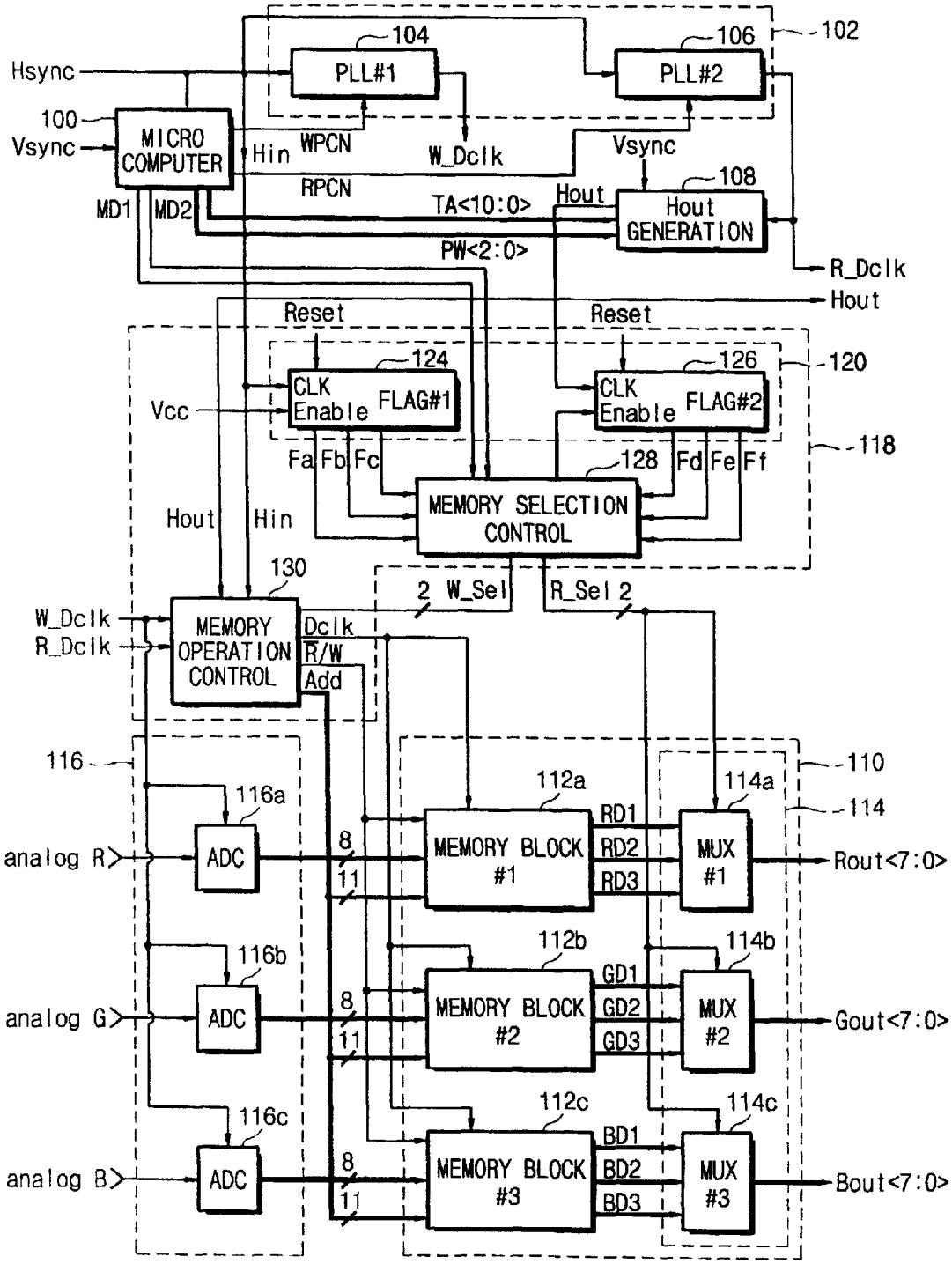
FIG. 5 is a block diagram showing the circuit construction of a novel video signal converting apparatus according to the principles of the present invention.

FIG. 5 shows the circuit construction of the video signal converting apparatus which converts the VGA or SVGA mode signals into XGA mode signals according to the present invention.

Referring to FIG. 5, the video signal converting apparatus comprises a microcomputer 100, a clock generator 102, a horizontal output generator 108, a memory section 110, an analog-to-digital (ADC) circuit 116 and a memory controller 118.

The horizontal signal Hsync and the vertical synchronization signal Vsync from the host are provided to microcomputer 100. Microcomputer 100 discriminates the display mode supported by the host (hereinafter, referred to as "host supporting display mode") by using horizontal signal Hsync and vertical synchronization signal Vsync, and generates first and second mode display signals MD1 and MD2 which represent the results. If the host supporting display mode is a SVGA mode, first and second mode display signals MD1 and MD2 of high level are fed from the microcomputer 100, and if the host supporting display mode is a VGA mode, first mode display signal MD1 of low level and second mode display signal MD2 of high level are fed from microcomputer 100. Also, when the host supporting display mode is XGA mode, first mode display signal MD1 of low level and second mode display signal MD2 of low level are fed from microcomputer 100. Microcomputer 100 also generates two data signals, one of which is a first data signal TA indicative of the number of pixels (i.e., pixel clocks) per cycle of horizontal output signal Hout being identical with the horizontal synchronization signal for XGA mode and the other is a second data signal PW indicative of the number of pixels corresponding to the pulse width of horizontal output signal Hout.

Besides the above signals, the microcomputer 100 generates two data signals, which, are used to control write and read operations of the memory section 110, one of which is a data signal WPCN indicative of the number of pixel clocks (i.e., the pixel clock number per one horizontal line according to the resolution of the detected host display mode) required to write video information of one horizontal line in the memory section during a write operation, and the other is a data signal RPCN indicative of the number of pixel clocks (i.e., the pixel clock per one horizontal line according to the resolution of the LCD supporting display mode) required to read video information of one horizontal line from the memory section during a read operation. If VGA mode is supported by the host 10, each value of data signals WPCN and RPCN is determined in the range of 1000 to 2500 in accordance with the horizontal and vertical frequencies. If SVGA mode is supported by the host 10, each value of data signals WPCN and RPCN is determined in the range of 1000 to 2000 in accordance with the horizontal and vertical frequencies.

As described above, microcomputer 100 detects the pixel number of the video signal (i.e., the resolution of the video signal) from the host by using the horizontal and vertical synchronization signals and compares the pixel number detected thus (i.e., the detected resolution) with the predetermined reference pixel number (i.e.,—, the predetermined reference resolution).

Clock generator 102 comprises two PLL circuits 104 and 106 which are respectively initialized by the signals WPCN and RPCN from microcomputer 100. PLL circuits 104 and 106 generate the write and read dot clock signals W_Dclk and R_Dclk for the memory write and read operations, respectively. Clock signals W_Dclk and R Dclk have frequencies corresponding to the signals WPCN and RPCN in synchronization with horizontal output signal Hout.

Horizontal output generator 108 generates horizontal output signal Hout by using the vertical synchronization signal Vsync from the host, first and second data signals TA, PW from microcomputer 100, and the read clock R_Dclk from PLL 106, as will be discussed later with respect to FIG. 12.

As shown in FIG. 5, the video signal converting apparatus of the present invention has a memory section 110 and an ADC circuit 116 which is provided to convert an analog video signal of serial format (i.e., analog RGB color signals) into a digital video signal of parallel format (i.e., digital RGB color data signals). Memory section 110, which is provided between ADC circuit 116 and LCD driver 40, has three memory blocks 112a 112b and 112c corresponding respectively to signals of R, G and B and an output selector 114. Each of memory blocks 112a 112b and 112c has at least three line memories.

The analog video signal from the host is sampled by ADC circuit 116 in synchronization with the write clock signal W_Dclk having a frequency which is determined by a difference between the resolution of the analog video signal detected by microcomputer 100 and the resolution supported by the LCD panel. That is, ADC circuit 116 is provided to convert a serial video signal for the CRT display apparatus of the host into a parallel video signal for the LCD device.

Horizontal synchronization signal Hsync is also referred to as Hin. Horizontal synchronization signal Hin, clock signals W_Dclk and R_Dclk from clock generator 102 and horizontal output signal Hout from the horizontal output generator 108 are supplied to a memory controller 118. Memory controller 118 has, as shown in FIG. 5, a flag circuit 120, a memory selection control circuit 128 and a memory operation control circuit 130. Memory controller 118 is provided to control the write operation of memory section 110 in response to horizontal synchronization signal Hin as well as a write pixel clock signal W_Dclk and to control the read operation of memory section 110 in response to the horizontal output signal Hout and the read pixel clock signal R_Dclk.

Flat circuit 120 generates flag signals indicative of the respective line memories for carrying out the write and read operations in each memory block in a predetermined order. Memory selection control circuit 128 generates memory write and read selection signals W_Sel and R_Sel, which are utilized to prevent the simultaneous occurrence of write and read operations in any one line memory of each memory block and to select line memories for carrying out the write and read operations separately. Memory operation control circuit 130 is provided to manage the write and read operations of the line memories in each memory block in response to the memory selection signal W_Sel. Memory operation control circuit 130 controls an access operation (i.e., write and read operations) to the line memories constituted by the respective memory block by means of memory selector 128.

In this embodiment, the horizontal output generator 108, the memory section 110 and the memory controller 118 may be constituted by a single chip. Thus, the signal converting apparatus has a compact structure.

Referring again to FIG. 5, memory 110 has three memory blocks 112a, 112b and 112c, and an output selection circuit 114 constituted by three 3×1 multiplexers 114a, 114b and 114c corresponding to each memory block.

Figure 6:
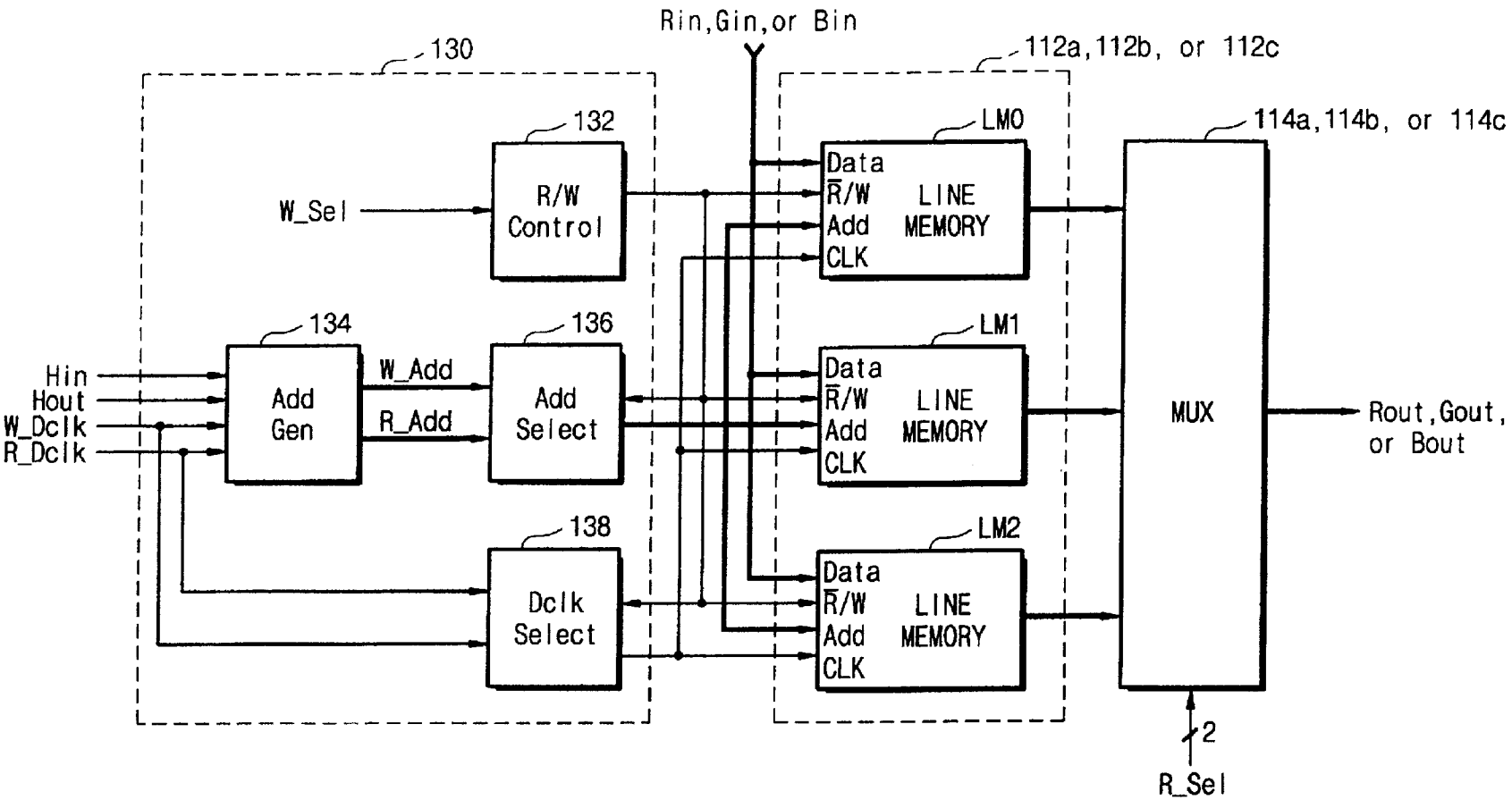
FIG. 6 is a block diagram showing the circuit construction which are associated with memory blocks shown in FIG. 5.

FIG. 6 shows the connection of one of the memory blocks 112a, 112b and 112c, between one of the multiplexers 114a, 114b and 114c, and memory operation control circuit 130, as shown in FIG. 5. The other two memory blocks of FIG. 5 are connected to the memory operation control circuit 130 in the same manner as shown in FIG. 6. Each of memory blocks 112a, 112b and 112c has three line memories LM0, LM1 and LM2. Each of the line memories have at least 1344 words×8 bits of storage capacity. Memory operation control circuit 130 comprises a write/read control 132, an address generator 134, an address selector 136 and a pixel clock selector 138. Write/read control 132 controls the write and read operations of line memories LM0, LM1 and LM2 of each memory block in response to the write memory selection signal W_Sel from memory selection control circuit 128. Address generator 134 generates write/read addresses W_Add and R_Add for memory write and read operations in response to horizontal synchronization signal Hin and horizontal output signal Hout. Address selector 136 selectively provides the write and read addresses W_Add and R_Add to the line memories LM0, LM1 and LM2 of each memory block in response to the output of write/read control section 132. Pixel clock selector 138 is selectively controlled by the output of the write/read control section 132, and selectively provides the write and read pixel clocks W_Dclk and R_Dclk to line memories LM0, LM1 and LM2 of each memory block.

Figure 7:
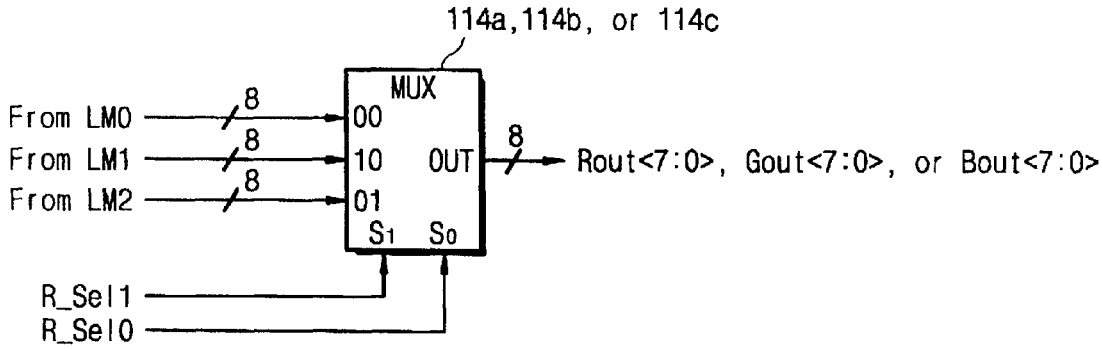
FIG. 7 is a detailed circuit diagram of an output selection circuit shown in FIG. 5.

FIG. 7 shows an example of output selection circuit 114a, 114b or 114c shown in FIG. 6. Referring to FIG. 7, three input terminals of 3×1 multiplexer 114a, 114b or 114c are connected to each of the data output ports (not shown) of line memories LM0, LM1 and LM2, and selectively outputs any of data from line memories LM0, LM1 and LM2 in response with to read memory selection signal R_Sel, i.e., R_Sel0 and R_Sel1, output by memory selection control circuit 128. The outputs Rout, Gout and Bout of each of the multiplexers 114a, 114b and 114c are supplied to LCD driving circuits 40.

If the mode signals of lower resolution than that of the corresponding LCD device are fed to the LCD control unit of the example from the host, the write and read operations of line memories LM0, LM1 and LM2 of each respective memory block 112a, 112b and 112c are carried out as follows.

In relation to each of the color signals, the memory write operation is carried out in synchronization with the horizontal synchronization signal Hin, and the memory read operation is carried out in synchronization with the horizontal output signal Hout. The memory write operation starts in the line memory LM0 of each memory block, the memory read operation starts in the line memory LM2 of each memory block, and the line memories of each memory block are selected in rotation for the write/read operation of each memory block. However, when a line memory during the write operation is required for a read operation, the read operation of the line memory which has just completed the previous read operation must be carried out once more.

Figure 8:
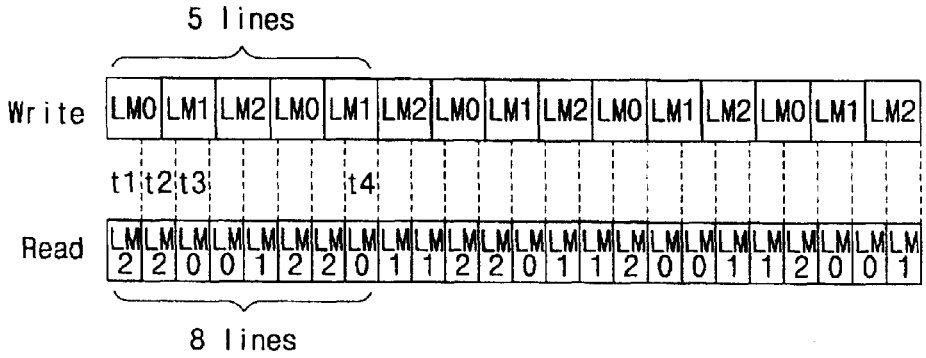
FIG. 8 is a diagram showing the write and read operations of the line memories when VGA mode signals are fed to the LCD control unit according to the principles of the present invention.

FIG. 8 illustrates the write and read operations of the line memories in each memory block when the VGA mode signals are fed to the LCD device capable of supporting XGA mode. As shown in FIG. 8, the VGA mode color signals of 5 lines are converted into the XGA mode color signals of 8 lines. When the conversion of the color signals begins, the write operation is carried out in a first line memory LM0 of the line memories, and the read operation in a second line memory LM2. After the read operation of line memory LM2, the read operation of line memory LM0 must follow, but, as shown in FIG. 8, line memory LM0 is continuously carrying out the write operation at the time t1, e.g. at the time the read operation of line memory LM2 is nearly completed. Thus, after the completion of the read operation of line memory LM2, the read operation which is previously carried out must be repeated once more in line memory LM2 so as to carry out the read operation of line memory LM0. At time t2, e.g. when the read operation of the second line memory LM2 is nearly completed, line memory LM1 is continuously carrying out the write operation. Accordingly, if a second read operation of the line memory LM2 is completed, a third read operation is carried out in line memory LM0, as shown in FIG. 8. Also, after the third read operation carried out through line memory LM0, a fourth read operation must be carried out in line memory LM1, but, line memory LM1 is continuously carrying out the write operation even after time t3, e.g. at the time the fourth read operation starts. Thus, the third read operation which is previously carried out in line memory LM0 must be repeated once more after the completion of the third read operation.

As described above, subsequent write and read operations are carried out such that the write and read operations are not be generated simultaneously for the same line memory. The write operation is carried out five times and the read operation eight times until time t4, as shown in FIG. 8. Thus, if the color signals R, G and B corresponding to five horizontal lines are fed from ADC circuit 116 to their respective memory blocks, the color signals corresponding to eight horizontal lines are generated from the corresponding memory block. This means that the ratio of the input line number to the output line number of each memory block is 1:1.6. Ultimately, a VGA mode signal as an input signal of the memory blocks is converted into a XGA mode output signal of the memory blocks.

Figure 9:
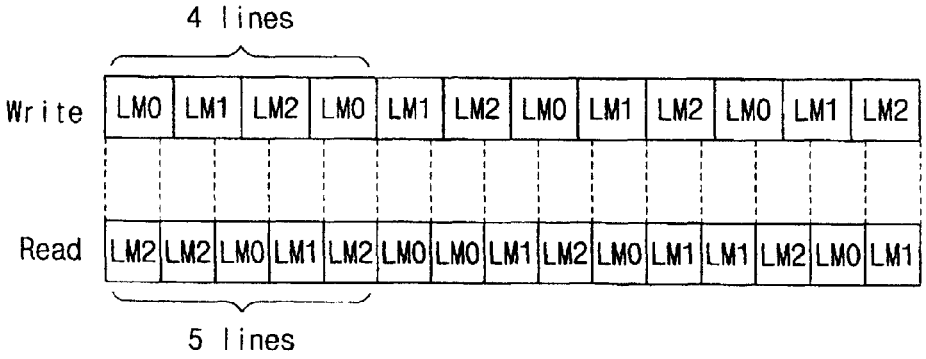
FIG. 9 is a diagram showing the operations of the line memories when SVGA mode signals are fed to the LCD unit according to the principles of the present invention.

FIG. 9 illustrates the operations of the line memories when SVGA mode signals are fed to the LCD device according to the present invention. In FIG. 9, if the color signals corresponding to five lines are written into each of the memory blocks, the color signals corresponding eight lines are read from the corresponding memory blocks according to the stated memory write/read processes. Thus, the SVGA mode color signals of four lines are converted into the XGA mode color signals of five lines.

Figure 10:
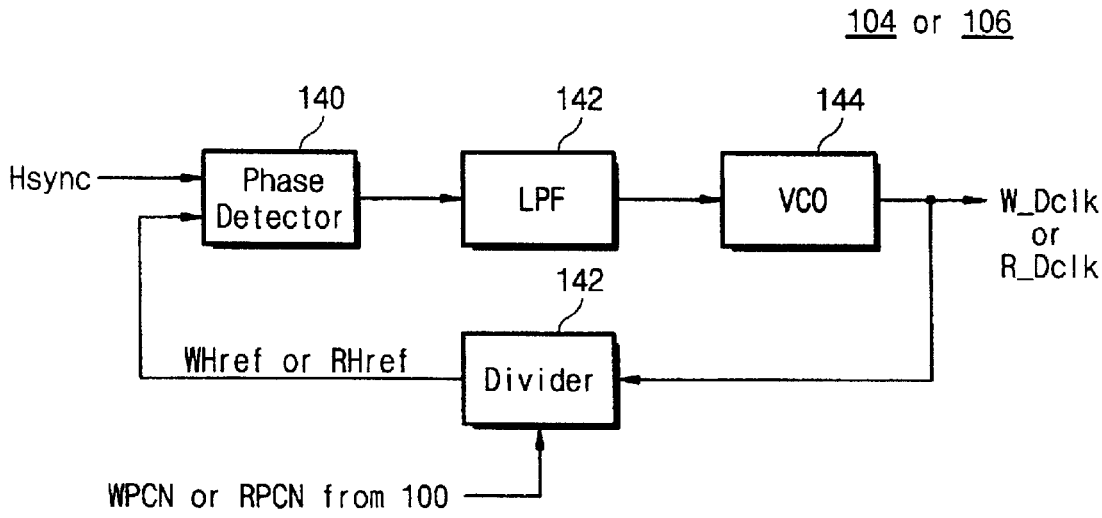
FIG. 10 is a detailed circuit diagram of the PLL circuit of the clock generator shown in FIG. 5.
Figure 11:
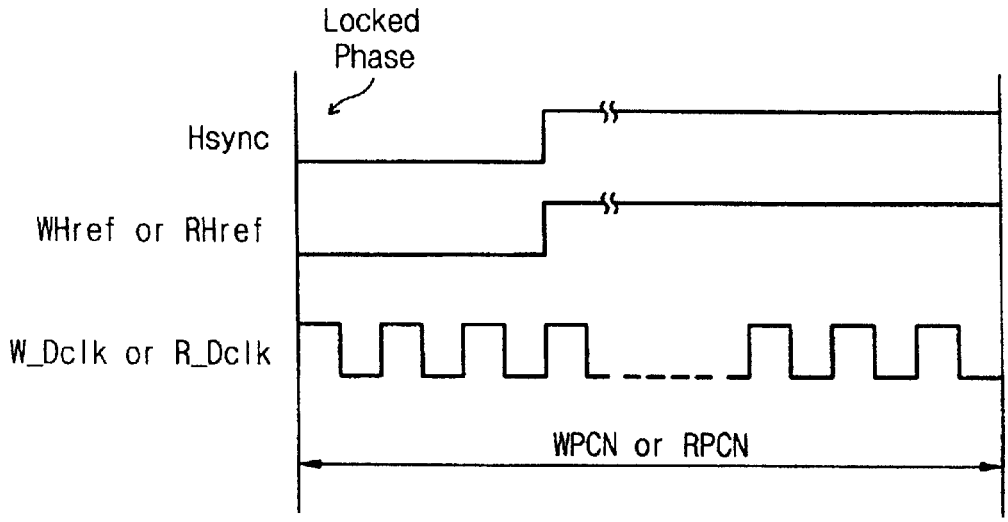
FIG. 11 is a timing diagram for explaining the operation of the PLL circuit shown in FIG. 10.

FIG. 10 illustrates PLL circuit 104 or PLL circuit 106 in clock generator 102. Each PLL circuit comprises a phase detector 104, a low pass filter 142, a voltage controlled oscillator (VCO) 144 and a divider 146. Divider 106 in PLL circuit 104, for a memory write operation, receives data signal WPCN from microcomputer 100 and generates a reference signal WHref. Phase detector 140 generates a DC voltage signal capable of being varied in accordance with a phase difference between horizontal synchronization signal Hsync from the host and reference signal WHref. The DC voltage signal is provided to low pass filter 142 so that noises contained in the voltage signal are filtered out. VCO 144 generates, as shown in FIG. 11, an in-phase clock signal as the clock signal W_Dclk. The in-phase clock signal has the frequency corresponding to the level of the DC voltage signal applied through low pass filter 142. Divider 106 in PLL circuit 106, for a memory read operation, receives data signal RPCN from microcomputer 100 and a reference signal RHref. Phase detector 140 generates a DC voltage signal capable of being varied in accordance with a phase difference between horizontal synchronization signal Hsync from the host and reference signal Rikef. The DC voltage signal is provided to low pass filter 142 so that noises contained in the voltage signal are filtered out. VCO 144 generates, as shown in FIG. 11, an in-phase clock signal as the clock signal R_Dclk. The in-phase clock signal has the frequency corresponding to the level of the DC voltage signal applied through low pass filter 142.

Figure 12:
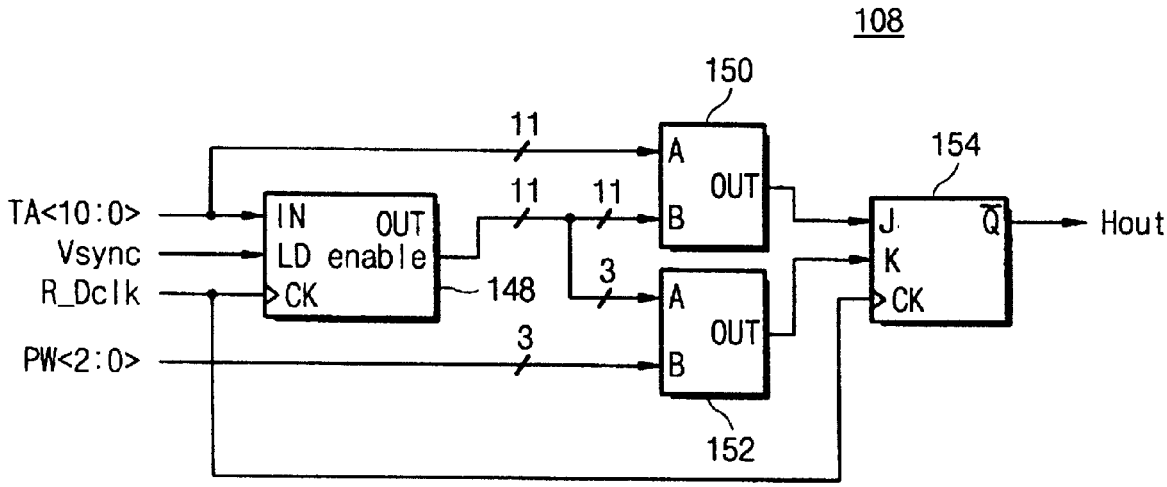
FIG. 12 is a circuit diagram of the horizontal output generation circuit shown in FIG. 5.
Figure 13:
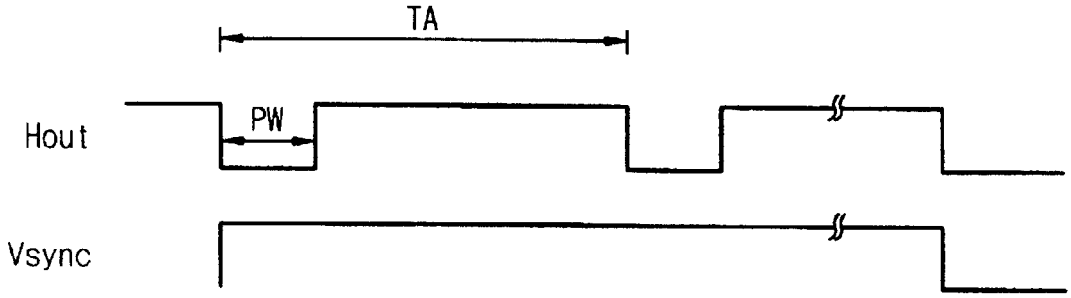
FIG. 13 is a timing diagram of a vertical synchronization signal and a horizontal output signal applied to the LCD control unit of FIG. 5.

With reference to FIG. 12, horizontal output generator 108 has a down counter 148, two comparators 150 and 152 and a JK flip-flop 154. Down counter 148 is enabled to load first data signal TA <10:0> of eleven bits from microcomputer 100 in response to vertical synchronization signal Vsync. When down counter 148 has an output count value of zero during Vsync, first data signal TA is loaded therein. Down counter 148 then counts down from the loaded values at each rising edge of read pixel clock R_Dclk. Comparator 150 outputs a high level signal, when the value of first data signal TA is equal to the output count value of down counter 148. At that time, a low level signal is fed from the negative output terminal $\overline{Q}$ of JK flip-flop 154, as shown by PW in FIG. 13. Comparator 152 outputs a high level signal, when the value of the three least significant bits of the output count value of down counter 148 is equal to the value of three bit second data signal PW <2:0> from microcomputer 100. At this time, the $\overline{Q}$ output of JK flip-flop 154 is inverted to high level, as shown in FIG. 13. When down counter counts down to zero, first data signal TA <10:0> is again loaded into down-counter 148 while enabled by Vsync, at which time comparator 150 again outputs a high level signal and the $\overline{Q}$ output of JK flip-flop 154 is again a low level, as shown in FIG. 13.

Figure 14:
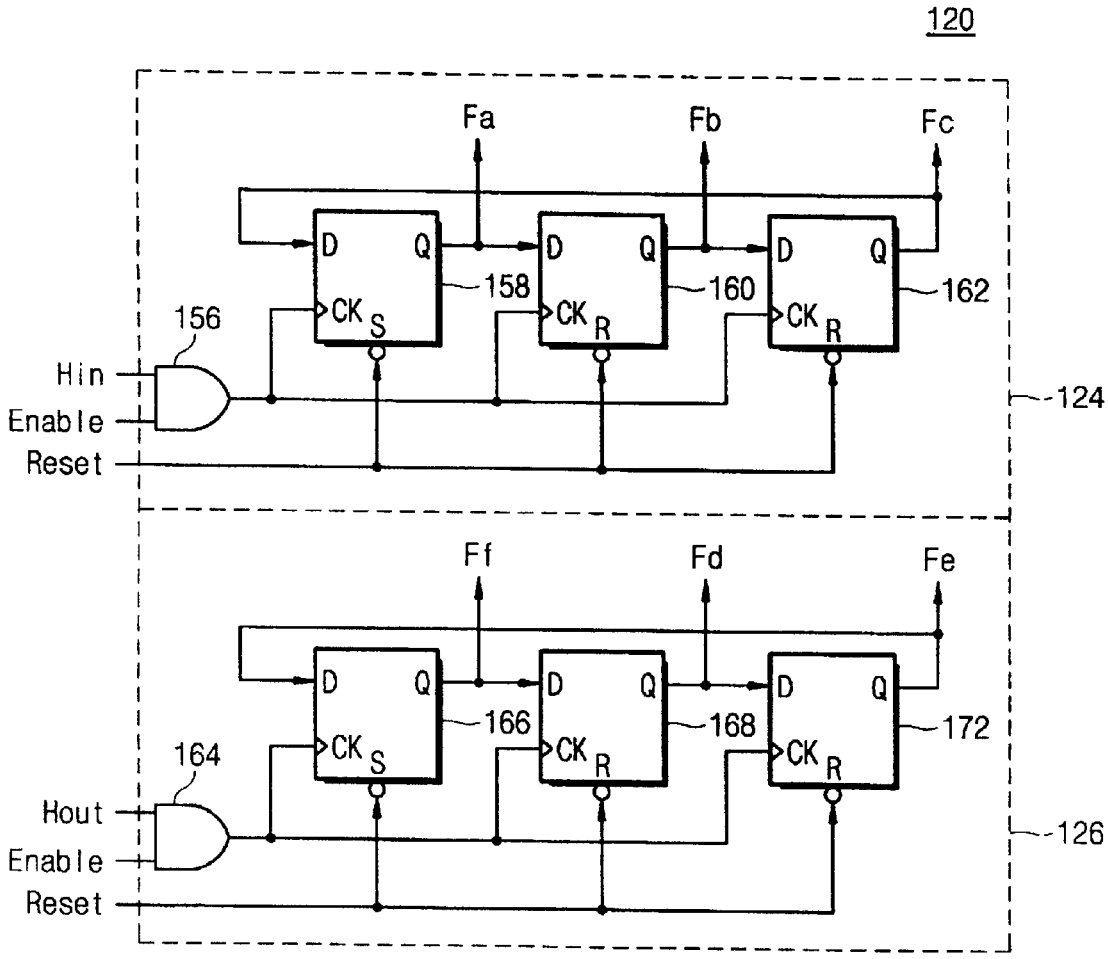
FIG. 14 is a circuit diagram of the flag circuit shown in FIG. 5.

In the flag circuit 120 shown in FIG. 14, the write flag generator 124 for generating flags Fa, Fb and Fc for write operation has identical construction to the read flag generator 126 for generating flags Fd, Fe and Ff for read operation. That is, each of the flag generators 124 and 126 has an AND gate and a rotating shift register composed of three D flip-flops. But, the horizontal synchronization signal Hin is fed to one input terminal of AND gate 156 of write flag generator 124, and the horizontal output signal Hout is fed to one input terminal of AND gate 164 of read flag generator 126. An enable signal at active high is provided by a voltage source Vcc to the other input terminal of AND gate 156, and an enable signal provided to the other input terminal of AND gate 164 is provided by memory selection control 128 as will be discussed later. Reset signals at active low are provided from microcomputer 100 to each of the flag generators 124 and 126. The reset signal fed to flag generator 124 is fed to the set terminal of a flip-flop 158 and the reset terminal of flip-flops 160 and 162, the reset signal fed to flag generator 126 is fed to the set terminal of flip-flop 166 and the reset terminal of flip-flops 168 and 170. Flags Fa and Ff have a high level and flags Fb, Fc, Fd and Fe have a low level, when the respective reset signals have a low level. When the enable signal is at high level and the reset signal is at high level, each of the outputs of the flag generators 124 and 126 are respectively shifted in response to the leading edges of horizontal synchronization signal Hin and the leading edges of horizontal output signal Hout. The flags are provided to memory selection control 128, and as a result, the line memory write operation and the line memory read operation are synchronized with the horizontal synchronization signal Hin and the horizontal output signal Hout, respectively and designated in rotation.

Figure 15:
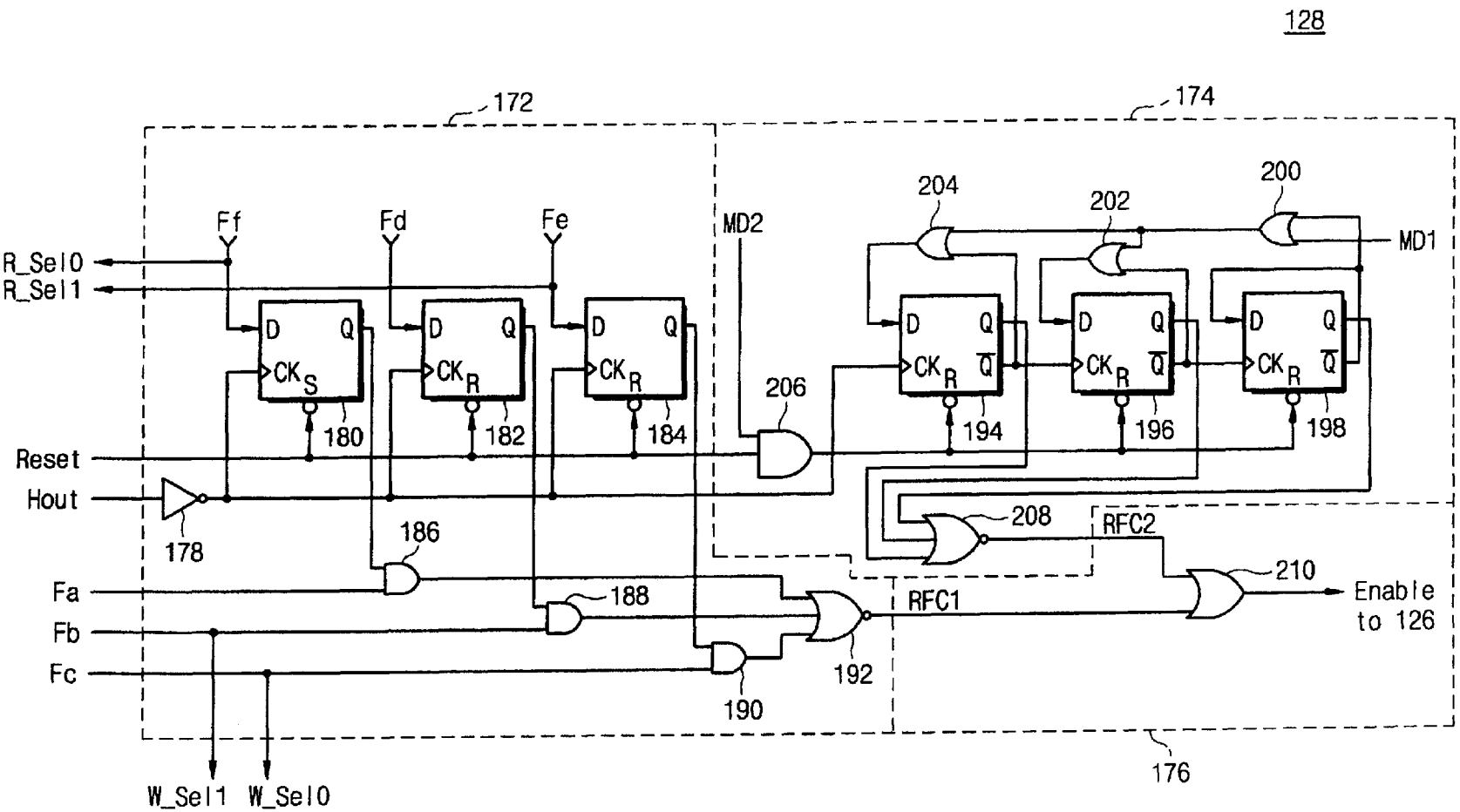
FIG. 15 is a circuit diagram of the memory selection control circuit shown in FIG. 5.

Memory selection control circuit 128 is shown in further detail in FIG. 15. Memory selection control circuit 128 has a selection error supervisor section 172, a cyclic error supervisor section 174 and a control signal output section 176.

Selection error supervisor section 172 has an inverter 178 inverting horizontal output signal Hout, D flip-flops 180, 182 and 184 receiving the read flags Ff Fd and Fe respectively at their D input terminal and latching them in synchronization with the output of the inverter 178 received at their clock input terminals, and a comparator for comparing read flags Ff Fd and Fe with the write flags Fa, Fb and Fc, respectively, to determine whether the read flag is identical with the write flag. The comparator has the combination of AND gates 186, 188 and 190 and a NOR gate 192. As shown in FIG. 15, write flag signals Fc and Fb are respectively used as write memory selection signals W_Sel0 and W_Sel1, and read flag signals Ff and Fe are respectively used as read memory selection signals R_Sel0 and R_Sel1. Write memory selection signals W_Sel0 and W_Sel1 and read memory selection signals R_Sel0 and R_Sel1 from supervisor section 172 are fed to memory operation control circuit 130 and output selection circuit 114, respectively. Table 3 and Table 4 show the selection of the line memories in each memory block as write and read memories in response to the write memory selection signals W_Sel0 and W_Sel1 and the read memory selection signals R_Sel0 and R_Sel1.

TABLE 3

| W_Sel1 | W_Sel0 | Line Memory for Write Operation |
|---|---|---|
| L | L | LM0 |
| H | L | LM1 |
| L | H | LM2 |

TABLE 4

| R_Sel1 | R_Sel0 | Line Memory for Read Operation |
|---|---|---|
| L | L | LM0 |
| H | L | LM1 |
| L | H | LM2 |

Figure 16:
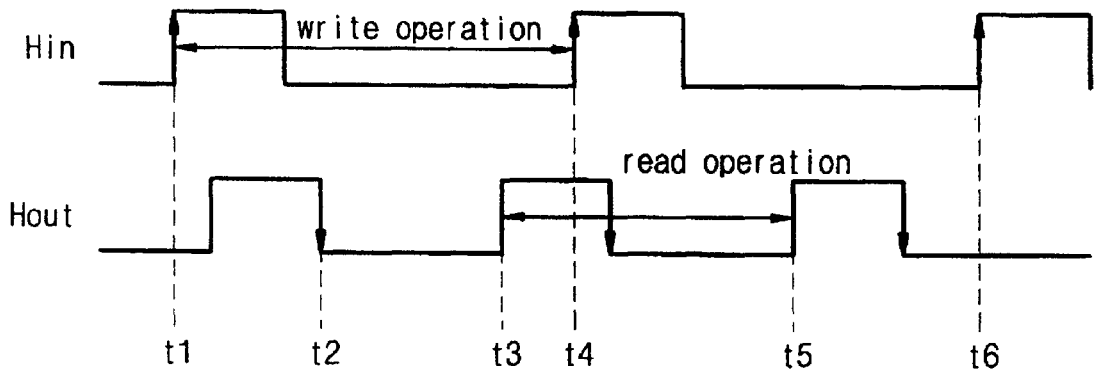
FIG. 16 is a timing diagram for explaining the selecting operation of the line memory for the read operation during the write operation according to the principles of the present invention.

In the meantime, selection error supervisor section 172 predicts whether a line memory is selected to perform its read operation before the write operation of the line memory is completed, and generates a read flag control signal RFC1 to disable read flag generator 126 when the line memory is selected for the next read operation. As shown in FIG. 16, the selection of line memory for the write operation is decided at the rising edge of the horizontal synchronization signal Hin, and the selection of line memory for the read operation is decided at the falling edge of the horizontal output signal Hout. For example, the line memory for the write operation is decided at time t1 during the range of time t1<t<t4 and the line memory for the read operation is decided at time t2 during the range of time t3<t<t5. At time t2, if the line memory for the next read operation is just the line memory during the present write operation, selection error supervisor section 172 generates the read flag control signal RFC1 of low level. Thus, read flag generator 126 is disabled and its outputs are not rotate-shifted. As a result, the line memory carrying out the present read operation is used for the next read operation once more. In the meantime, at the time t2, if the line memory for the next read operation is not the line memory during the present write operation, selection error supervisor section 172 generates the read flag control signal RFC1 of high level. Thus, read flag generator 126 is enabled and the outputs of read flag generator 126 are rotatively shifted. As a result, the line memory, which has to be operated next to the line memory carrying out the read operation, is selected to carry out the following read operation.

As shown in FIG. 15, cyclic error supervisor section 174 has a counter circuit composed of D flip-flops 194, 196 and 198, a counting range control circuit composed of an AND gate 200 and OR gates 202 and 204, a reset circuit 206 composed of a single AND gate 206, and a read flag control circuit 208 composed of a single NOR gate 208. Counting range control circuit 200, 202 and 204 controls the output range of counter circuit 194, 196 and 198 in response to a first mode display signal MD1 from microcomputer 100. The reset circuit 206 receives the reset signal and second mode display signal MD2 which are supplied from microcomputer 100, and thus allows counter circuit 194, 196 and 198 to be reset, when a XGA mode signal is fed to the LCD device. Read flag control circuit 208 generates a read flag control signal RFC2 to enable read flag generator 126 shown in FIG. 14.

In this embodiment, read flag control circuit 208 generates read flag control signal RFC2 to enable read flag generator 126 to be activated, when the outputs of counter circuit 194, 196 and 198 are totally indicative of a decimal value "5" if the LCD device according to this embodiment receives a VGA mode signal, or when the outputs of counter circuit 194, 196 and 198 are totally indicative of a decimal value "8" if the LCD device receive a SVGA mode signal. In detail, if cyclic error supervisor section 174 receives a VGA mode signal, read flag control signal RFC2 is generated whenever the outputs of counter circuit 194, 196 and 198 indicate a decimal number "5". And if cyclic error supervisor section 174 receives a SVGA mode signal, read flag control signal RFC2 is generated whenever the outputs of the counter circuit 194, 196 and 198 indicate a decimal number "8". This read flag control signal RFC2 is utilized to prevent horizontal synchronization signal Hin and horizontal output signal Hout from being matched. If these signals Hin and Hout are synchronously matched, the LCD controller may malfunction.

Control signal output section 176 comprises an OR gate having two input terminals for receiving the output signal RFC1 of selection error supervisor section 172 and the output signal RFC2 of cyclic error supervisor section 174, respectively, and an output terminal connected to an enable terminal of read flag generator 126. If the output signal of control signal output section 176 is at low level, read flag generator 126 is disabled. At this time, even though horizontal output signal Hout is input, the outputs of read flag generator 126 are not rotatively shifted. However, if the output signal of control signal output section 176 is at high level, read flag generator 126 is enabled. At this time, the outputs of read flag generator 126 are rotatively shifted in response to a horizontal output signal Hout of high level.

Figure 17:
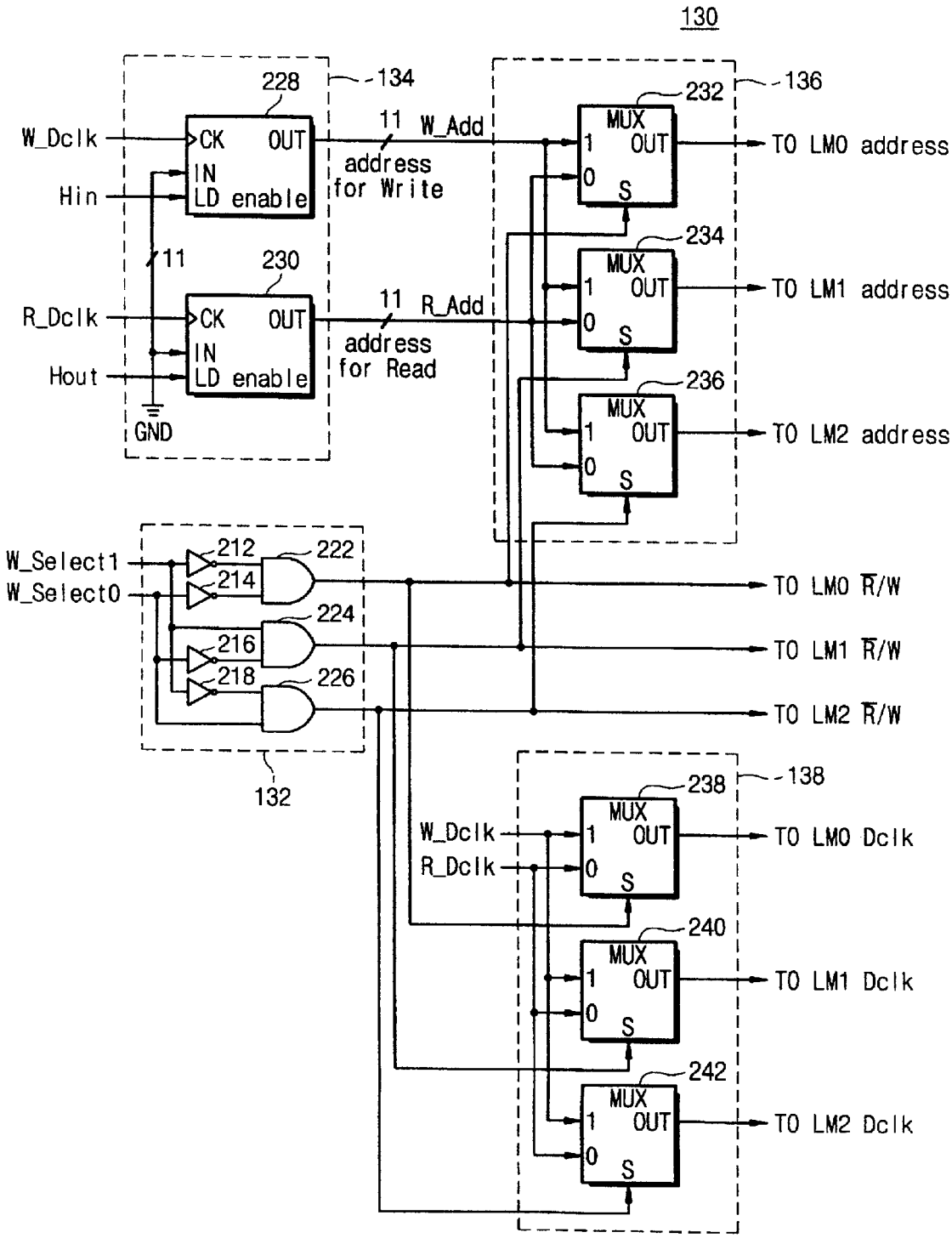
FIG. 17 is a circuit diagram of the memory operation control circuit shown in FIG. 6.

FIG. 16 is a timing diagram for explaining the selecting operation of the line memories for the read operation by means of memory operation control circuit 130, shown in FIG. 17, during the write operation.

In the memory operation control circuit 130 shown in FIG. 17, a write/read control section 132 has inventors 212, 214, 216 and 218, and AND gates 222, 224 and 226. First, as shown in Table 3, if the signal W_Sel0 is at "L", i.e., low level and the signal W_Sel1 is at "L" in each of the memory blocks, line memory LM0 is at a write enable state and line memories LM1 and LM2 all are at a read enable state. Next, if the signal W_Sel0 is at "L" and the signal W_Sel1 is at "HI", i.e., high level line memory LM1 is at the write enable state and line memories LM0 and LM2 all are at the read enable state. Finally, if W_Sel0 is at "H" and W_Sel1 is at "L," line memory LM2 is a write enable state and line memories LM0 and LM1 all are at a read enable state. Also, an address generator 134 has a write address generator 228 and a read address generator 230. Write address generator 228 is reset in response to horizontal synchronization signal Hin, and operated in synchronization with write pixel clock signal W_Dclk to generate an address W_Add for the write operation. And read address generator 230 is initialized in response to horizontal output signal Hout, and operated in synchronization with read pixel clock signal R_Dclk to generate an address R_Add for the read operation. Write address generator 228 and read address generator 230 are each composed of an up-counter.

An address selector 136 has three 2×1 multiplexers 232, 234 and 236, each of which has two input terminals for receiving the write and read addresses W_Add and R_Add respectively. Line memories LM0, LM1 and LM3 of each memory block receive the outputs of multiplexers 232, 234 and 236, respectively. The selection control terminals of multiplexers 232, 234 and 236 receive the outputs of AND gates 222, 224 and 226 in the write/read control section 132, respectively. Line memories LM0, LM1 and LM2 of each memory block selectively receive write addresses W_Add or read addresses R_Add via multiplexers 232,234 and 236 in response to the outputs of AN?D gates 222, 224 and 226 of the write/read control section 132.

Additionally, a pixel clock selector 138 comprises three 2×1 multiplexers 238, 240 and 242, each which has two input terminals for receiving the write and read pixel clocks W_Dclk, R_Dclk respectively. Line memories LM0, LM1 and LM3 of each memory block receive the outputs of multiplexers 238, 240 and 242, respectively. The selection control terminals of multiplexers 238, 240 and 242 receive the outputs of AND gates 222, 224 and 226 of write/read control section 132, respectively. Line memories LM0, LM1 and LM2 of each memory block selectively receive the write pixel clock W_Dclk and read pixel clock R_Dclk via multiplexers 238, 240 and 242 in response to the outputs of AN?D gates 222, 224 and 226 of the write/read control section 132.

As described above, even though a high-resolution supporting display device having a video signal converting apparatus according to the present invention receives a low-resolution video signal from a host, an image corresponding to the video signal can be displayed on the entire screen of the display device by means of the video signal converting apparatus.

Although the present invention has been described in terms of a color signal of eight bits in the above preferred embodiment, it will be understood that various other modifications, for example an embodiment regarding a color signal of sixteen bits or more, will be apparent to and can be readily made by those skilled in the art without departing from the scope and spirit of this invention.

Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art which this invention pertains.

What is claimed is:

[1. A liquid crystal display device for receiving horizontal and vertical synchronization signals and at least one analog video signal synchronized with said horizontal synchronization signal from a host and displays an image on a screen thereof said LCD device comprising:

a display mode discriminating means for discriminating a display mode supported by said host in response to said horizontal and vertical synchronization signals to generate first and second mode signals and first, second, third and fourth data signals related to said discriminated display mode;

a clock generator for generating first and second pixel clock signals in synchronization with said horizontal synchronization signal, said first and second pixel clock signals having frequencies corresponding to said first and second data signals, respectively, a pulse number of said first pixel clock signal corresponding to one horizontal line being equal to a value of said first data signal and a pulse number of said second pixel clock signal corresponding to one horizontal line being equal to a value of said second data signal;

an analog-to-digital converter for converting said at least one analog video signal into a digital video signal in synchronization with said first pixel clock signal;

a memory for storing said digital video signal;

a horizontal output generator for receiving said third and fourth data signals in response to said vertical synchronization signal and generating a horizontal output signal, said digital video signal being read from said memory in synchronization with said horizontal output signal, a pixel number per one cycle of said horizontal output signal being equal to a value of said third data signal, and a pixel number per a pulse width of said horizontal output signal being equal to a value of said fourth data signal; and a memory controller for enabling said digital video signal to be stored in said memory in accordance with said first and second mode signals, said horizontal synchronization signal and said first pixel clock signal, and enabling said digital video signal stored in said memory to be read from said memory in accordance with said second mode signal, said horizontal output signal and said second pixel clock signal.]

[2. The liquid crystal display device as set forth in claim 1, wherein said memory comprises:

first, second and third memory blocks corresponding to red, green, and blue data of said digital video signal, each of said memory blocks having at least three line memories, wherein each of said line memories stores said corresponding red, green and blue data of said digital video signal from said ADC and corresponding to one horizontal line; and first, second and third multiplexers for selectively outputting data from each of said line memories of corresponding ones of said memory blocks in response to a data selection signal from said memory controller.]

[3. The liquid crystal display device as set forth in claim 2, wherein said memory controller comprises:

a flag generator for generating a plurality of write flag signals and a plurality of read flag signals;

a memory selector for generating said first and second memory selection signals for selecting said line memories in response to said write and read flag signals to block simultaneous read and write operations of a same one of said line memories; and a memory operation control circuit for controlling write and read access to said line memories in each of said memory blocks in response to said horizontal synchronization signal, said horizontal output signal, said first memory selection signal and said first and second pixel clock signals.]

[4. The liquid crystal display device as set forth in claim 1, wherein said memory, said horizontal output generator and said memory controller are constituted by a single chip.]

[5. A video signal converting apparatus which is provided to convert a first display signal of serial format into a second display signal of parallel format, said apparatus comprising:

means for detecting a first resolution signal indicative of a resolution of said first display signal using horizontal and vertical synchronization signals related to said first display signal;

means for comparing said first resolution signal with a second resolution signal indicative of a reference resolution; and means for converting said first display signal of serial format into said second display signal of parallel format, if there is a difference between said first and said second resolution signals.]

[6. A display apparatus which receives horizontal and vertical synchronization signals, and a video signal of serial format synchronized with said horizontal synchronization signal from a host, and displays an image on a screen composed of a plurality of horizontal lines, each of said horizontal lines having a plurality of pixels, said display apparatus comprising:

means for detecting the pixel number corresponding to said video signal from said host using said horizontal and vertical synchronization signals;

means for comparing the pixel number with a reference pixel number; and means for sampling said video signal using a first frequency clock generated in accordance with a difference between the pixel number and the reference pixel number; and means for displaying said sampled video signal on said screen in synchronization with a second frequency clock generated in accordance with said difference.]

[7. The display apparatus of claim 6, wherein said sampling means comprises a first clock generator for generating said first frequency clock synchronized with said horizontal synchronization signal in response to a first data signal from said detecting means, the pulse number of said first frequency clock corresponding to one horizontal line being equal to a value of said first data signal, and a converter for converting said video signal of serial format into a video data signal of parallel format.]

[8. The display apparatus of claim 6, wherein said displaying means comprises a second clock generator for generating said second frequency clock synchronized with said horizontal synchronization signal in response to said first data signal, the pulse number of said first frequency clock corresponding to one horizontal line being equal to a value of said first data signal, and a horizontal output generator for generating a horizontal output signal in response to second and third data signals from said detecting means, said sampled video signal being synchronized with said horizontal output signal.]

[9. The display apparatus of claim 6, further comprising a converter for converting said sampled video signal into a data signal corresponding to the number of said horizontal lines in accordance with a predetermined ratio determined by said difference between the pixel number and the reference pixel number, said data signal being provided to said displaying means.]

[10. A video signal converting method which is provided to convert a first display signal of serial format into a second display signal of parallel format, said method comprising:

detecting a first resolution signal indicative of a resolution of said first display signal using horizontal and vertical synchronization signals related to said first display signal;

comparing said first resolution signal with a second resolution signal indicative of a reference resolution; and converting said first display signal of serial format into said second display signal of parallel format, when said comparing step determines that there is a difference between said first and said second resolution signals.]

*11. A liquid crystal display device for receiving horizontal and vertical synchronization signals and at least one analog video signal synchronized with said horizontal synchronization signal from a host and displaying an image on a screen thereof, said LCD device comprising:*

*a display mode discriminating means for discriminating a display mode supported by said host in response to said horizontal and vertical synchronization signals to generate first and second mode signals and first, second, third and fourth data signals related to said discriminated display mode;*

*a clock generator for generating first and second pixel clock signals in synchronization with said horizontal synchronization signal, said first and second pixel clock signals having frequencies corresponding to said first and second data signals, respectively, a pulse number of said first pixel clock signal corresponding to one horizontal line being equal to a value of said first data signal and a pulse number of said second pixel clock signal corresponding to one horizontal line being equal to a value of said second data signal;*

*an analog-to-digital converter for converting said at least one analog video signal into a digital video signal in synchronization with said first pixel clock signal;*

*a horizontal output generator for receiving said third and fourth data signals in response to said vertical synchronization signal and generating a horizontal output signal, a pixel number per one cycle of said horizontal output signal being equal to a value of said third data signal, and a pixel number per a pulse width of said horizontal output signal being equal to a value of said fourth data signal; and*

*a memory controller for enabling said digital video signal to be stored in accordance with said first and second mode signals, said horizontal synchronization signal and said first pixel clock signal, and enabling said stored digital video signal to be read in accordance with said second mode signal, said horizontal output signal and said second pixel clock signal;*

*wherein a frame rate at which said image is displayed is the same as a frame rate of said received vertical synchronization signal.*

* * * * *